US009831776B1

(12) United States Patent
Jiang et al.

(10) Patent No.: US 9,831,776 B1
(45) Date of Patent: Nov. 28, 2017

(54) DC-DC CONVERTER (71) Applicant: Google Inc., Mountain View, CA (US)

(72) Inventors: Shuai Jiang, Saratoga, CA (US); Xin Li, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/184,740

(22) Filed: Jun. 16, 2016

(51) Int. Cl.
*H02M 3/158* (2006.01)
*H02M 1/15* (2006.01)

(52) U.S. Cl.
CPC .............. *H02M 3/158* (2013.01); *H02M 1/15* (2013.01)

(58) Field of Classification Search
CPC .......... H02M 3/158; H02M 1/15; H02M 3/07; H02M 2001/0054; H02M 1/083; H02M 1/4241; H02M 2007/4815; H02M 3/3372; H02M 5/458; H02M 3/33507; H02M 3/33592; Y02B 70/1491; Y02B 70/1433
USPC ................. 363/21.01, 21.02, 21.03, 97, 127; 323/235; 327/536
See application file for complete search history.

(56) References Cited

U.S. PATENT DOCUMENTS

| 4,552,422 A * | 11/1985 | Bennett ................. H05K 7/1084 361/783 |
| 4,695,872 A * | 9/1987 | Chatterjee ........... H01L 23/5385 257/700 |
| 4,912,401 A * | 3/1990 | Nady, II ................ H01R 12/523 324/756.05 |
| 7,746,041 B2 | 6/2010 | Xu et al. |
| 2002/0108236 A1 * | 8/2002 | Sonnichsen .......... H01R 43/205 29/740 |
| 2008/0198634 A1 * | 8/2008 | Scheel .................. H02M 3/158 363/21.02 |
| 2008/0229759 A1 * | 9/2008 | Ouyang ................. H01L 23/38 62/3.3 |
| 2009/0079385 A1 * | 3/2009 | Xiao .................... H02M 3/1584 320/102 |
| 2015/0077175 A1 | 3/2015 | Giuliano et al. |
| 2015/0115909 A1 * | 4/2015 | Glovinski .............. H02M 1/34 323/235 |
| 2015/0188402 A1 * | 7/2015 | Panigrahi ................ H02M 1/08 307/31 |
| 2016/0056713 A1 * | 2/2016 | Janik .................... H02M 3/1582 323/293 |

FOREIGN PATENT DOCUMENTS

WO    2006/114719    11/2006

OTHER PUBLICATIONS

Cao et al., "A Family of Zero Current Switching Switched-Capacitor DC-DC converters,", Applied Power Electronics Conference and Exposition (APEC), 2010 Twenty-Fifth Annual IEEE, Mar. 18, 2010.*

(Continued)

*Primary Examiner* — Timothy J Dole
*Assistant Examiner* — Htet Z Kyaw
(74) *Attorney, Agent, or Firm* — Fish & Richardson P.C.

(57) ABSTRACT

An apparatus that includes a resonant DC-DC converter with switching frequencies based on stray inductances of the physical components used to construct the apparatus. This results in a relatively high efficiency and high density DC-DC converter that, in some implementations, does not require a discrete inductor component.

19 Claims, 10 Drawing Sheets

(56) References Cited

OTHER PUBLICATIONS

Received search report from EIC 2800 STIC searcher Benjamin Martin dated Mar. 27, 2017.*
Cao et al., "Multilevel modular converter with reduced device count for hybrid and electric vehicle," Transportation Electrification Conference and Expo (ITEC), 2015 IEEE, Jun. 2015, pp. 1-6.
Cao et al., "Zero-Current-Switching Multilevel Modular Switched-Capacitor DC-DC Converter," IEEE Transactions on Industry Applications, 46(6):2536-2544, Sep. 2010.
Guo, "High efficiency charge pump based dc-dc converter for wide input/output range applications," Ph.D. dissertation, Electrical Engineering, North Carolina State University, 2010, 161 pages.
Keiser et al., "High Power Resonant Switched-Capacitor Step-Down Converter," 2008 IEEE Power Electronics Specialists Conference, Jun. 2008, pp. 2772-2777.
Kesarwani et al., "Resonant-Switched Capacitor Converters for Chip-Scale Power Delivery: Design and Implementation," IEEE Transactions on Power Electronics, 30(12):6966-6977, Dec. 2014.
Lei et al., "A General Method for Analyzing Resonant and Soft-Charging Operation of Switched-Capacitor Converters," IEEE Transactions on Power Electronics, 30(10):5650-5664, Dec. 2014.
Naresh et al., "Performance of Phase-Shift Control Using High-Efficiency Switched-Capacitor-Based Resonant Converter," Power Electronics and Renewable Energy Systems, vol. 326 of the series Lecture Notes in Electrical Engineering, Nov. 2014, pp. 591-600.
Peng et al., "A magnetic-less DC-DC converter for dual-voltage automotive systems," IEEE Transactions on Industry Applications, 39(2):511-518, Mar./Apr. 2003.
Shoyama et al., "Resonant Switched Capacitor Converter with High Efficiency," 2004 35th Annual IEEE Power Electronics Specialists Conference, Jun. 2004, pp. 3780-3786.

* cited by examiner

DC-DC CONVERTER

BACKGROUND

This specification relates to DC-DC converters.

Converters for converting a first DC voltage to a second DC voltage are availing for a wide range of applications. Switched capacitor converters (SCC) are one example. A conventional SCC includes multiple flying capacitors and switches. Input and output bulk capacitors are also typically required for power buffering and energy storage. The switches are typically controlled with a certain switching frequency, and multiple switching states are used to transfer power from an input to an output through charging and discharging flying capacitors.

Some SCCs also use inductor components to set certain resonant frequencies for switching. By driving the switches at resonant frequencies of the resulting charging and discharging circuits, Zero Current Switching (ZCS) can be achieved.

SUMMARY

In general, one innovative aspect of the subject matter described in this specification can be embodied in a resonant switched capacitor converter that includes a circuit bearing structure; a plurality of capacitors electrically connected to the circuit bearing structure, each capacitor having respective first and second nodes; a plurality of switches electrically connected to the circuit bearing structure, each switch having first and second terminals and an input that receives a control signal that places the switch in either a closed state in which a conduction path is established between the first and second terminals, or an open state in which the conduction path is eliminated between the first and second terminals; a plurality of respective conductive traces that each respectively connect one of the first or second nodes of a capacitor to one of the first or second terminals of a switch, and wherein: at least one conductive trace defines a switched converter input node for receiving in input DC voltage and at least one conductive trace defines a switched converter output node for outputting an output DC voltage; and stray inductances of the resonant switched capacitor converter form distributed resonant inductors within the resonant switched capacitor converter; and control logic that generates two or more sets of control signal inputs applied to the inputs of the switches so that two or more respective conduction paths that are different from each other are formed between the switched converter input node and the switched converter output node, wherein each conduction path forms a switched circuit unique to the conduction path and having a respective resonant frequency defined by the stray inductances of the resonant switched capacitor converter, and the control logic generates the respective sets of control signal inputs at respective resonant frequencies for each switched circuit. Other embodiments of this aspect include corresponding methods.

Another innovative aspect of the subject matter described in this specification can be embodied in a microprocessor chip package, comprising: a pin grid array receptacle for receiving a microprocessor chip; and a plurality of a resonant switched capacitor converters, each resonant switched capacitor converter comprising: a plurality of capacitors electrically connected to the chip package, each capacitor having respective first and second nodes; a plurality of switches electrically connected to the chip package, each switch having first and second terminals and an input that receives a control signal that places the switch in either a closed state in which a conduction path is established between the first and second terminals, or an open state in which the conduction path is eliminated between the first and second terminals; a plurality of respective conductive traces that each respectively connect one of the first or second nodes of a capacitor to one of the first or second terminals of a switch, and wherein: at least one conductive trace defines a switched converter input node for receiving in input DC voltage and at least one conductive trace defines a switched converter output node for outputting an output DC voltage; and the chip package, the stray inductances of the chip package form distributed resonant inductors within the resonant switched capacitor converter; and control logic that generates two or more sets of control signal inputs applied to the inputs of the switches so that two or more respective conduction paths that are different from each other are formed between the switched converter input node and the switched converter output node, wherein each conduction path forms a switched circuit unique to the conduction path and having a respective resonant frequency defined by the stray inductances, and the control logic generates the respective sets of control signal inputs at respective resonant frequencies for each switched circuit. Other embodiments of this aspect include corresponding methods.

Particular embodiments of the subject matter described in this specification can be implemented so as to realize one or more of the following advantages. By employing a distributed resonant inductance that is relatively small when compared to the inductances used in SCCs that include discrete inductors (e.g., an inductance that is two orders or magnitude lower compared to converters that use discrete inductors), the stray inductance DC-DC converter can achieve soft charging and soft switching while at the same time providing ultra-high density and efficiency. For example, some implementations that utilize the technology described below can achieve an increase in efficiency of over 3% while reducing the overall size of the converter circuit by 40%.

The high density, low footprint topology enabled by the stray inductance DC-DC converter allows for further simplified designs of larger circuit components. For example, a microprocessor chip package can include parallel converters integrated into the package due to the reduced size of the converter. By doing so, the microprocessor chip package can be designed such that it has a lower input current rating than a microprocessor chip package that does not include the integrated converters. This is because the microprocessor chip package using the integrated converters can receive a higher voltage input, and thus requires a lower input current, as the final conversion is performed within the microprocessor chip package.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter of this written description relates to a resonant switched capacitor converter that utilizes the stray inductances of its constituent components to realize a resonant circuit with a distributed inductance. Because discrete inductor components are not required, the converter has a relatively higher efficiency and relatively high density when compared to converters that utilize discrete inductors.

Figure 1:
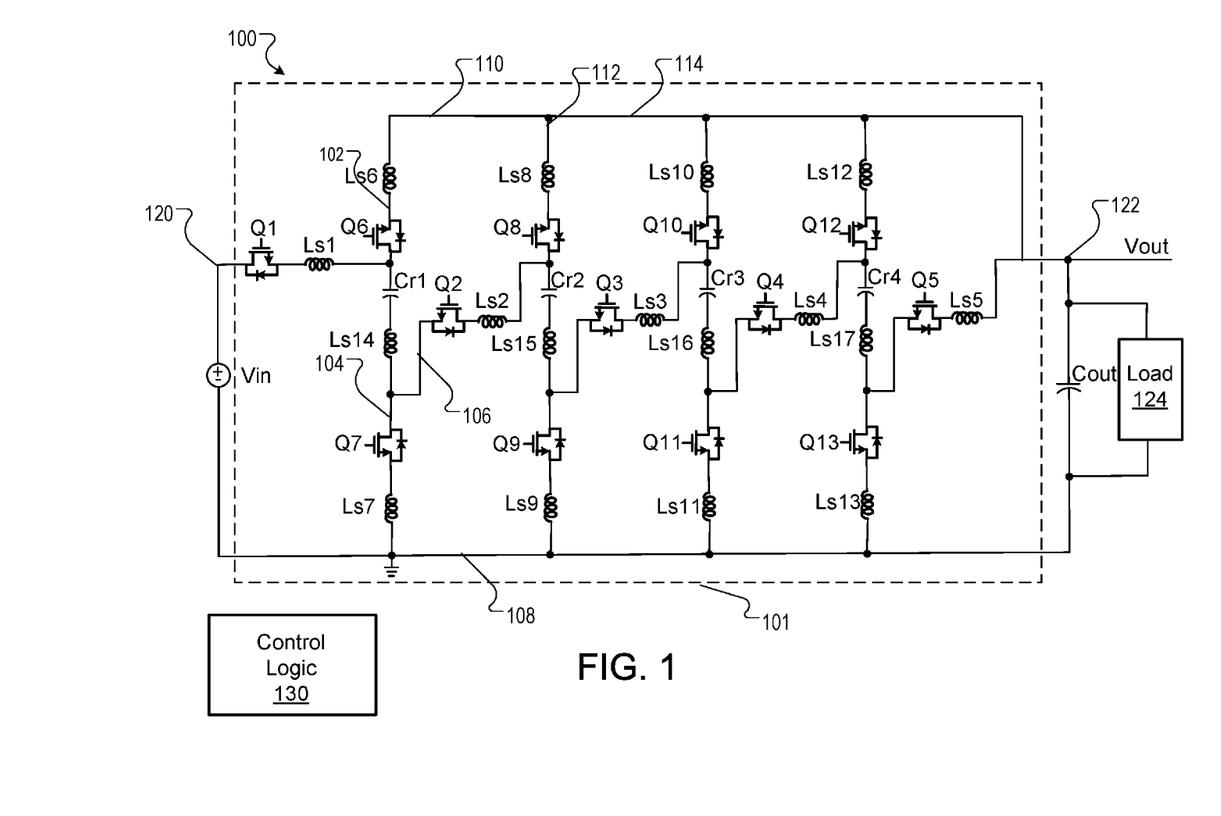
FIG. 1 is a circuit diagram of an example series-parallel resonant switched capacitor converter with distributed stray inductance.

FIG. 1 is a circuit diagram of an example series-parallel resonant switched capacitor converter 100 with distributed stray inductance. The circuit 100 is constructed on or within a circuit bearing structure 101, such as a printed circuit board, silicon substrate, or any other appropriate circuit bearing structure.

A plurality of capacitors C1-C4 are electrically connected to the circuit bearing structure 101, and each capacitor has respective first and second nodes. Switches Q1-Q13 are electrically connected to the circuit bearing structure 101. Each switch has first and second terminals and an input that receives a control signal that places the switch in either a closed state in which a conduction path is established between the first and second terminals, or an open state in which the conduction path is eliminated between the first and second terminals. In the example circuit shown, field effect transistor are used as the switches, with the sources and drains as the terminals and the gates as the inputs. Other appropriate switching devices can also be used.

Respective conductive traces, e.g., 102, 104, 106, 108, 110, 112 and 114, respectively connect one of the first or second nodes of a capacitor C to one of the first or second terminals of a switch Q. To avoid congestion in the drawings, all of the respective traces are not individually labeled. At least one conductive trace defines a switched converter input node 120 for receiving in input DC voltage, and at least one conductive trace defines a switched converter output node 122 for outputting an output DC voltage, such as a DC voltage to supply a load 124.

The inductances Ls1-Ls13 shown in FIG. 1 are not discrete inductors, but instead are the inductances resulting from the stray inductances of the components of the circuit bearing structure 101, the capacitors C, the switches Q, and the lengths of the conductive traces. Specifically, the circuit bearing structure 101, the capacitors C, the switches Q, and the lengths of the conductive traces are selected such that the resulting stray inductances from the lengths and respective positions of the conductive traces, the stray inductances of the circuit bearing structure 101, and the equivalent series inductances (ESL) of the capacitors C form distributed resonant inductors within the resonant switched capacitor converter 100. The above parameters are selected based on desired switching frequencies for various charge and discharge circuits, desired flying capacitors that meet ripple requirement, and desired quality factors of the resonant circuit that ensures appropriate resonance. The values can be determined by simulation software and/or by empirical analysis, or any other appropriate technique. In some implementations, the stray inductance values can be designed by 2D or 3D electromagnetic field solver simulation tools and verified by field measurement.

In some implementations, a magnetic core or magnetic material may be added to the circuit to increase the stray inductance of the resulting circuit. For example, a magnetic material, such as a ferromagnetic metal layer, may be added as a layer with a circuit board upon which the components described above are integrated. Alternately, a surface made of the magnetic material may be mounted by spacers above the circuit board and separate from the components. In still another implementation, non-contiguous sections of the magnetic material may be placed within the circuit board, above the circuit board, or deposited on the circuit board in juxtaposition, but separate from, the components described above. By limiting the coupling between the magnetic material and the circuit components to magnetic coupling, the stray inductances may be further tuned and adjusted.

To generate the charge and discharge circuits, control logic 130 generates two or more sets of control signal inputs applied to the inputs of the switches Q so that two or more respective conduction paths that are different from each other are formed between the switched converter input node 120 and the switched converter output node 122. Each conduction path forms a switched circuit unique to the conduction path and having a respective resonant frequency defined, in part, by the stray inductances of the conductive traces and the circuit bearing structure and the equivalent inductances of the capacitors. The control logic 130 generates the respective sets of control signal inputs at respective resonant frequencies for each switched circuit.

The control logic 130 can generate two or more switching states, each of which forms one or more equivalent LC resonant tanks. Accordingly, there are multiple resonant frequencies in the circuit 100. In some implementations, the control logic 130 control the switches in a way such that they are turned on and off upon current reaching zero current, e.g., zero current switching (ZCS). This ZCS feature minimizes switching losses. This results in a higher efficiency compared to a conventional hard-switched switched capacitor converter. Furthermore, the circuit 100 allows larger voltage ripples on the flying capacitors due to the lossless switching feature. Hence, the flying capacitor sizes may be reduced when compared to those that are used in a system that does not have ZCS.

The "on" and "off" time of each switching state depends on the resonant frequency of the inductors and flying capacitors involved in that particular switching state. Also, as input and output bulk capacitors are much larger than the flying capacitors, such bulk capacitors can reasonably be treated as voltage sources, which have negligible impact to the resonant frequency. Ideally, the "on" time of a switching state equals to a half of the sinusoid resonant period of the equivalent LC circuit. In practice, however, because the existence of series resistance introduces some damping to the resonant circuit, the actual "on" time of each switching state can be tuned slightly higher than a half of the equivalent sinusoid LC resonant period for ZCS.

In an example implementation, the circuit 100 can be implemented in a DC-DC intermediate bus converter (IBC) for a data center server application. Using 48V as input, the circuit 100 can down-convert to 12V or below. The power rating may range from few hundreds of watts to several kW. A low voltage (<100V) MOSFETs with fast switching capabilities is sued, and by use of the ZCS soft switching, a circuit 100 can switch at speeds above 1 MHz. Certain switches that are wide bandgap devices, such as Gallium-Nitride FETs, allow for even higher switching frequencies. For such an IBC application frequencies, the resonant inductors usually fall into the range of a few nH and smaller, e.g., 10 nH or smaller. Accordingly, the distributed stray inductances describe above, and which are created from MOSFET package, PCB copper traces, capacitor ESL, provide distributed resonant inductors without the need of discrete inductors.

As described above, various charge and discharging states can be realized by use of the control logic 130. One example is described with reference to FIGS. 2, 3A and 3B, and another example is described with reference to FIGS. 2, 4A and 4B.

Figure 2:
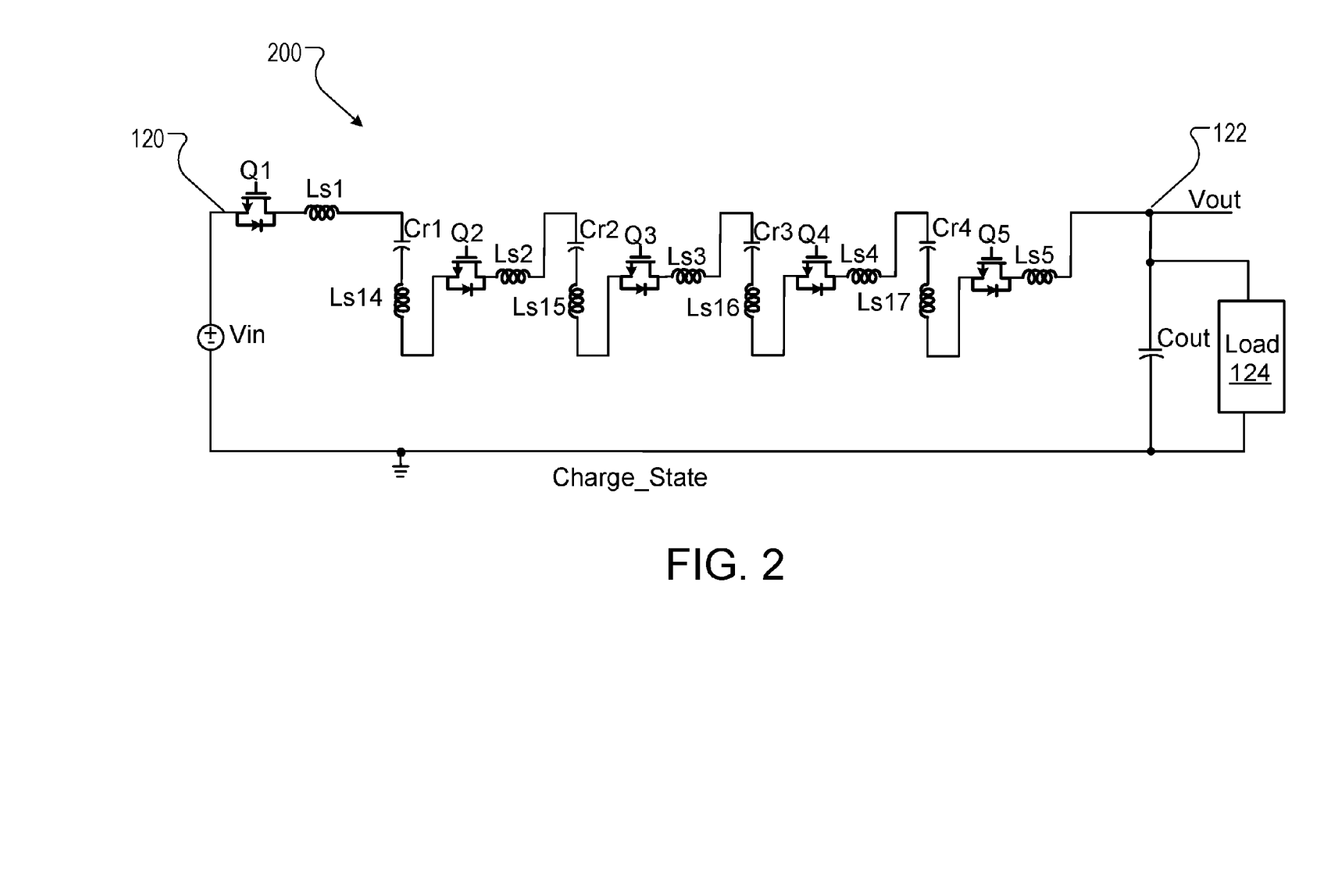
FIG. 2 is circuit diagram of the circuit of FIG. 1 in charging state.
Figure 3A:
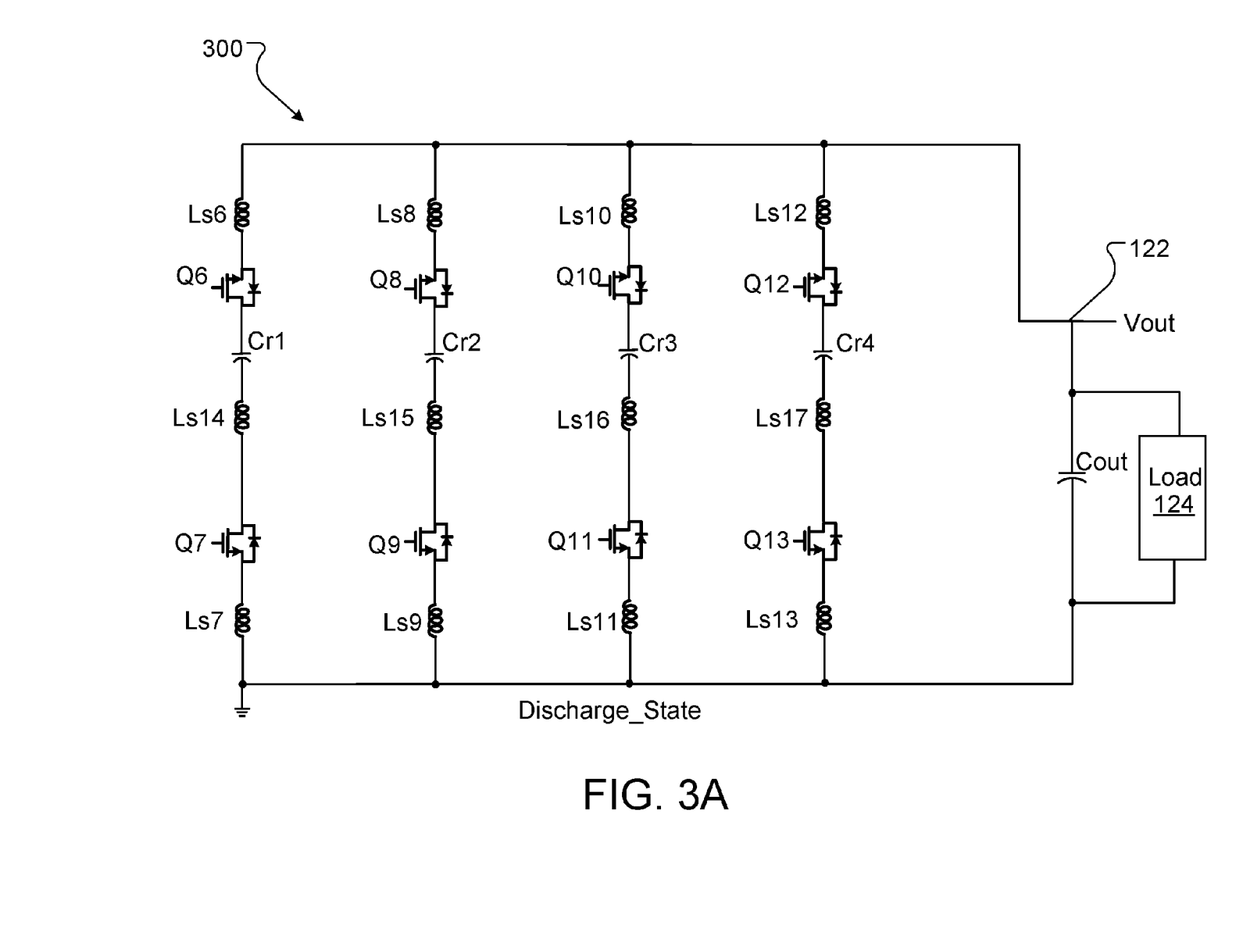
FIG. 3A is a circuit diagram of the circuit of FIG. 1 in one example discharging state.
Figure 3B:
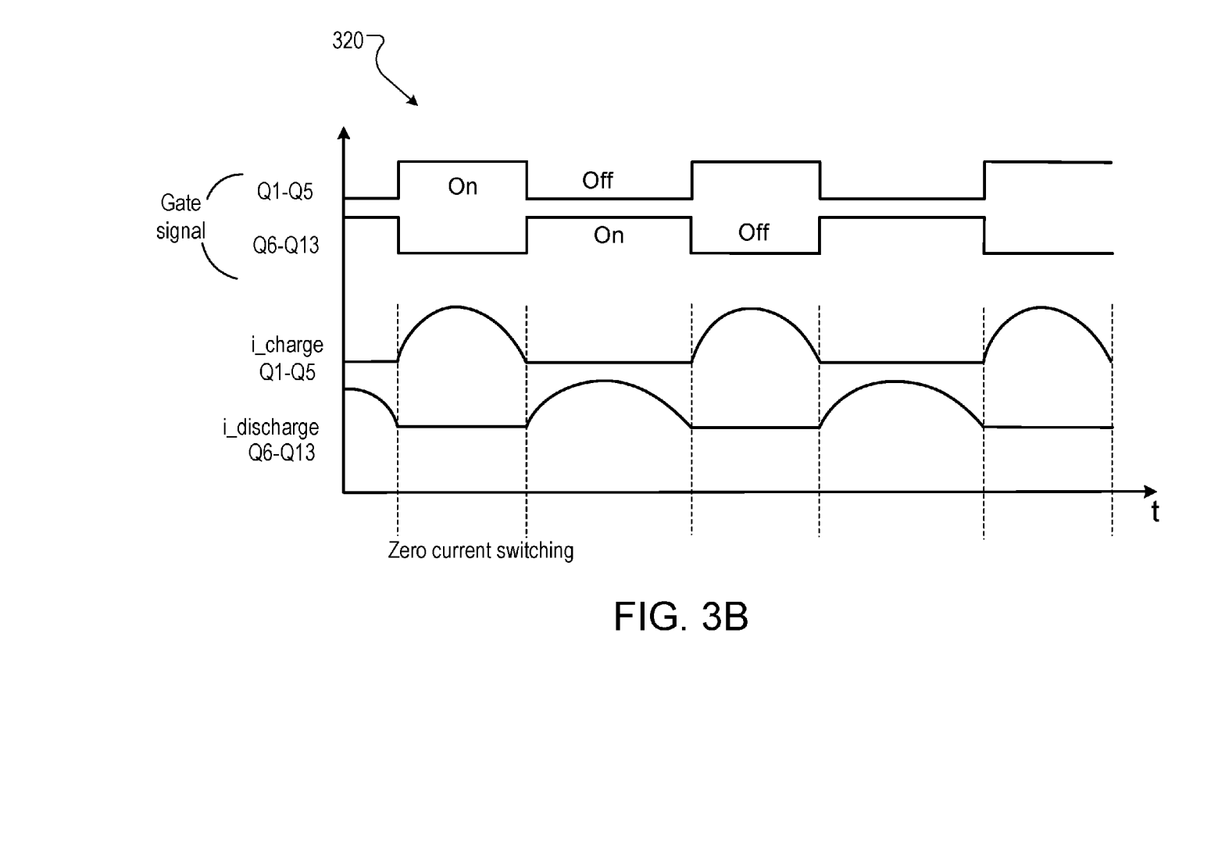
FIG. 3B is a timing diagram of the input signals for the switches and the current waveforms during the charging states and discharging states of the circuits in FIGS. 2 and 3A, respectively.

FIG. 2 is circuit diagram 200 of the circuit of FIG. 1 in charging state. In this state, switches Q1-Q5 are on, and all other switches are off, forming a series LC circuit. FIG. 3A is a circuit diagram 300 of the circuit of FIG. 1 in one example discharging state. In this state, Q6-Q13 are on, and Q1-Q5 are off, forming parallel LC circuits. FIG. 3B is a timing diagram 320 of the input signals for the switches and the current waveforms during the charging states and discharging states of the circuits in FIGS. 2 and 3A, respectively. As indicated by the timing diagram 320, the transistors Q1-Q5 and Q6-Q13 are toggled on and off, respectively, according to the resonant frequencies of the resulting circuits 200 and 300. This facilitates ZCS, as illustrated by the respective charge and discharge currents of depicted in FIG. 3B. Because the resonant frequencies of each circuit may differ, and in the circuits 200 and 300 the resonant frequencies do differ, the duration of the ON state for Q1-Q5 may differ from the duration of the ON state for Q6-Q13. In a similar manner, the OFF states may differ in a complementary manner.

Figure 4A:
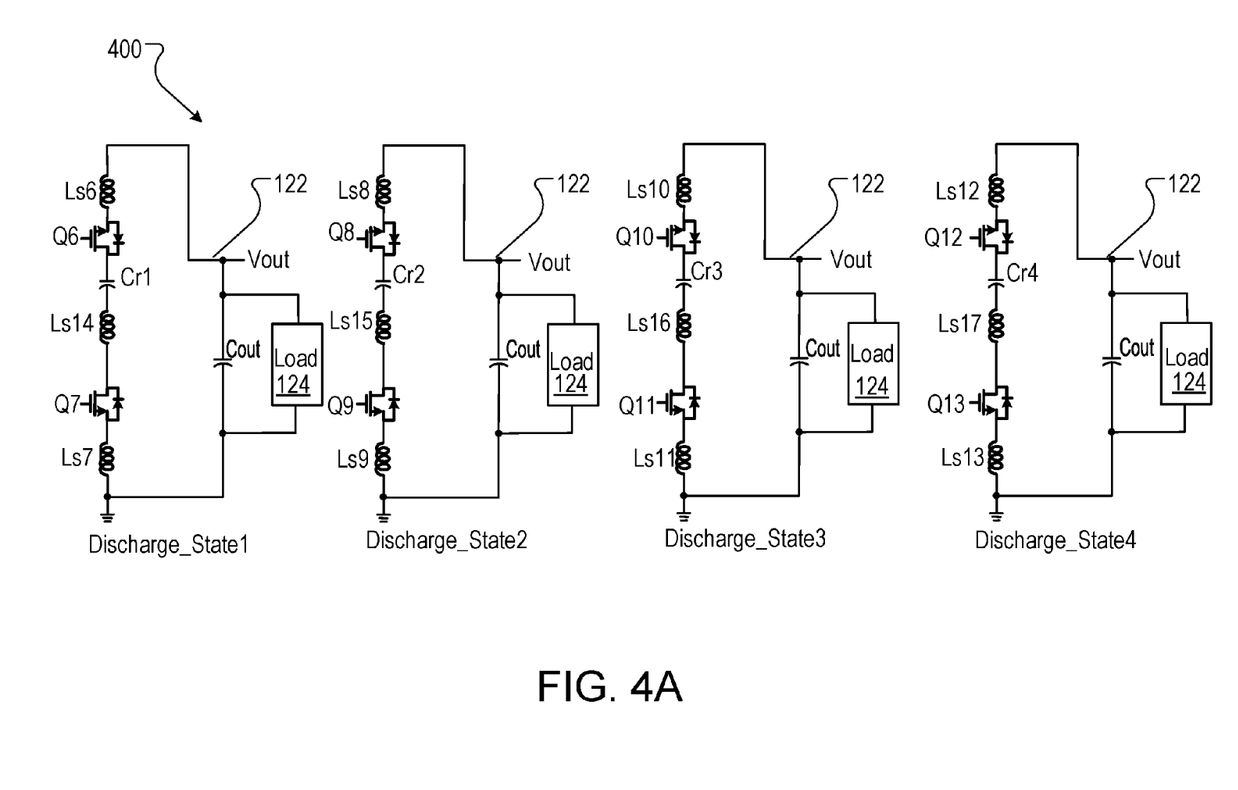
FIG. 4A is a circuit diagram of four separate discharging states of the circuit of FIG. 1.
Figure 4B:
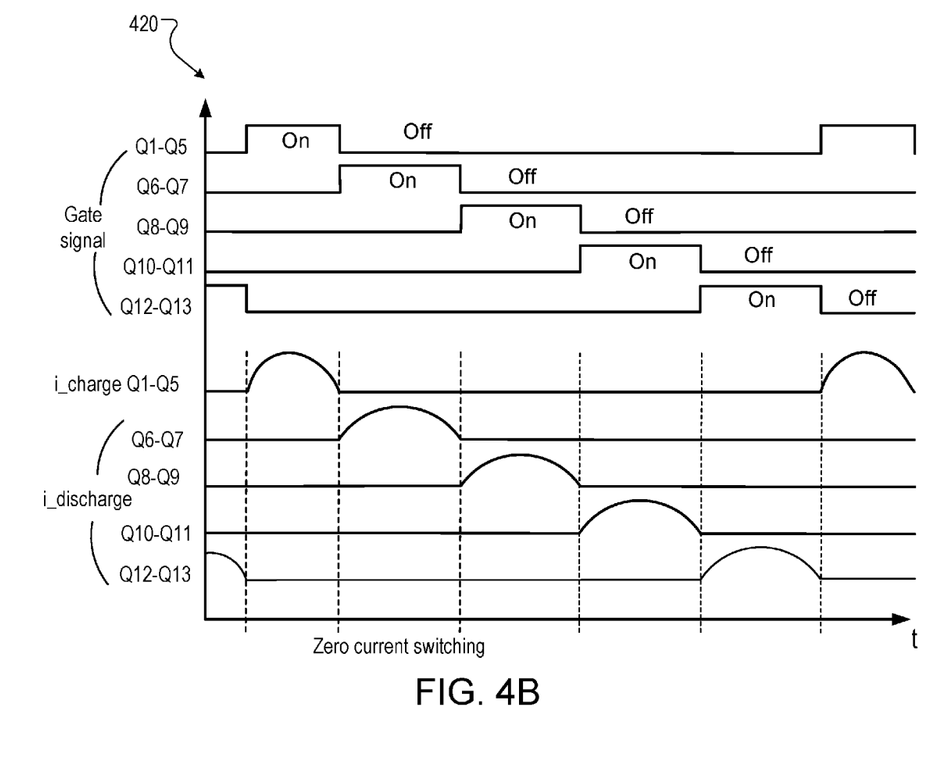
FIG. 4B is a timing diagram of the input signals for the switches and the current waveforms during the charging states and discharging states of the circuits in FIGS. 2 and 4A, respectively.

Portions of the circuit 100 may be selectively interleaved during charging or discharging. FIG. 4A is a circuit diagram 400 of four separate discharging states of the circuit of FIG. 1, and FIG. 4B is a timing diagram 420 of the input signals for the switches and the current waveforms during the charging states and discharging states of the circuits in FIGS. 2 and 4A, respectively. As show in FIG. 4B, pairs of switches—Q6 and Q7, Q8 and Q9, Q10 and Q11, and Q12 and Q13—are switched in an interleaved manner to realize the separate discharge circuits of FIG. 4A. The interleaving technique of FIG. 4A can be applied for current ripple cancellation and input/output capacitor reductions.

The particular topology of the resonant switched capacitor converter 100 of FIG. 1 is illustrative only, and the features of the circuit 100 are not limited to the particular topology shown. Any combination of the circuit elements described above can be used, and other voltage conversion ratios can be implemented, so long as the resulting stray capacitance of the particular layout is derived and/or measured during the design process so that the corresponding resonant frequencies can be obtained.

Furthermore, with a first-order approximation, the resonant switched capacitor converter can be modelled as a DC transformer in series with an output resistor Rout. The equivalent DC transformer has a primary to secondary ratio of K:1 (in FIG. 1, K=5) which is equal to the voltage conversion of the resonant switched capacitor converter. Rout is determined by the conductive droops contributed from switch Rds_ons, copper trace resistances, flying capacitor equivalent series resistance, etc. The resulting distributed resonant inductors in the resonant switched capacitor converter are sufficiently small such that their impact to the equivalent model is often negligible. Therefore, an open-loop controlled (or unregulated) resonant switched capacitor converter is intrinsically stable. Due to the intrinsic droop from Rout, multiple identical resonant switched capacitor converter cells can be connected in parallel to facilitate scaling for higher power requirement. Likewise, current sharing is facilitated by the nearly identical $R_{out}$ of each resonant switched capacitor converter in parallel connection.

Because the resonant switched capacitor converter has only distributed stray inductances (or, alternatively, very small discrete inductors), the converter can achieve very high power density. Thus, a resonant switched capacitor converter can be used to generate intermediate bus voltages while being placed next to the second stage point of load voltage regulators, such as on a motherboard, to minimize power distribution losses along the intermediate voltage bus, especially when the intermediate bus carries high current. Examples of such applications are described below.

Figure 5:
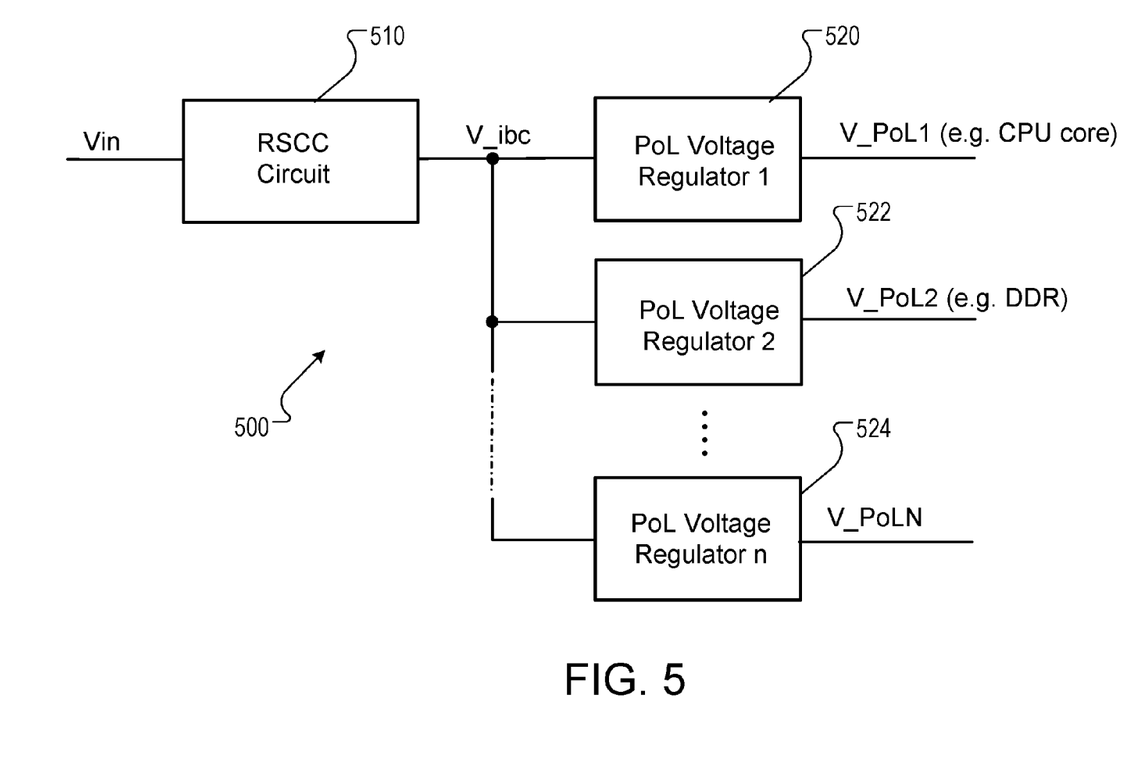
FIG. 5 is a block diagram of a two-stage point of load (PoL) power delivery architecture with a resonant switched capacitor converter and multiple point of load converters.

FIG. 5 is a block diagram of a two-stage point of load (PoL) power delivery architecture 500 with a resonant switched capacitor converter 510 and multiple point of load converters 520, 522 and 524. In FIG. 5, the resonant switched capacitor converter 510 receives an input voltage $V_{in}$ and steps the voltage down to an intermediate bus voltage $V_{ib}$. For example, the input voltage may be 48 V, and the intermediate bus voltage may be 12 V. The point of load converters 520, 522 and 524 each receive the intermediate bus voltage as input and generate a corresponding output regulated output voltage, e.g., 3.3 V, 1.8 V, 1.2 V, etc., depending on the voltage requirements of the load. The point of load converters convert the intermediate bus voltage for microprocessors, memories, ASICs and other load ICs. Example point of load converters include multi-phase buck converters.

Figure 6:
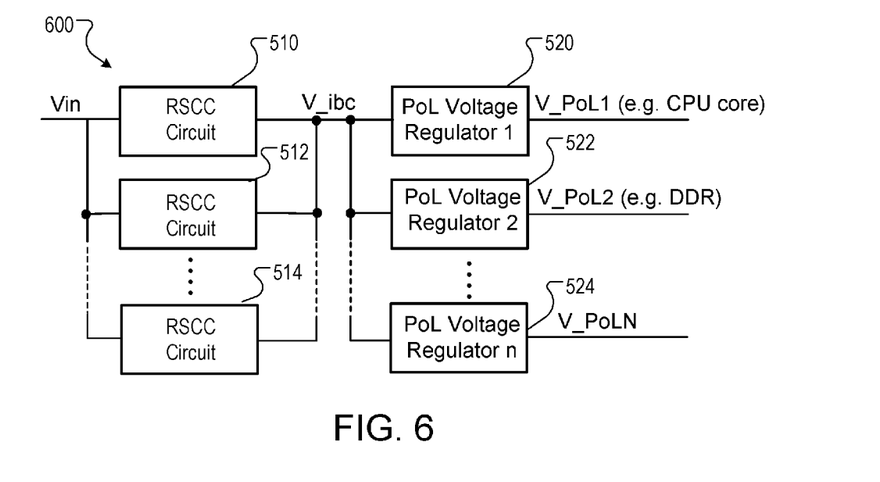
FIG. 6 is a block diagram of a two-stage point of load power delivery architecture with multiple resonant switched capacitor converters in parallel and multiple point of load converters.

FIG. 6 is a block diagram of a two-stage point of load power delivery architecture 600 with multiple resonant switched capacitor converters 510, 512, and 514 in parallel and multiple point of load converters 520, 522 and 524. The architecture 600 is similar to the architecture 500, except that the architecture 600 includes multiple resonant switched capacitor converters 510, 512, and 514 in parallel. Multiple resonant switched capacitor converters may be used in parallel when a power delivery requirement exceeds the power delivery capability of any one resonant switched capacitor converters. A pulse width modulation (PWM) interleaving technique can be applied for parallel operation to reduce output voltage ripples.

Figure 7:
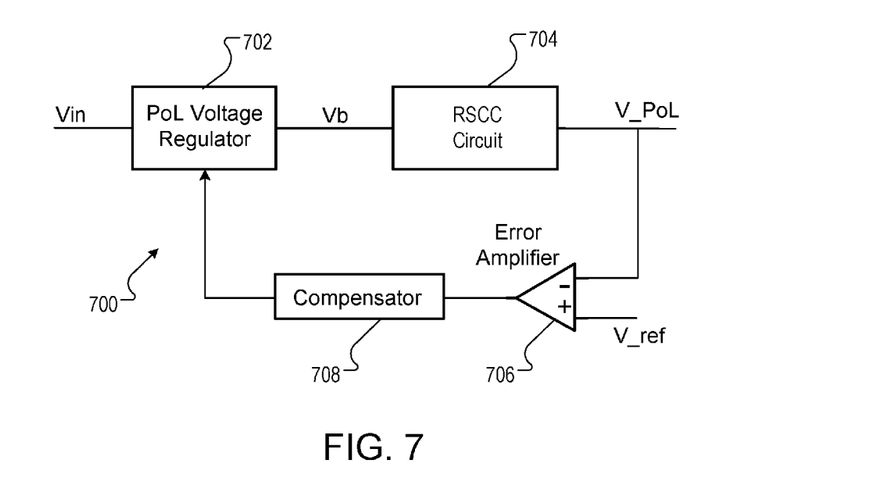
FIG. 7 is a block diagram of a two-stage point of load power delivery architecture with a point of load converter providing an output voltage as input to a resonant switched capacitor converter.

FIG. 7 is a block diagram of a two-stage point of load power delivery architecture 700 with a point of load converter 702 providing an output voltage as input to a resonant switched capacitor converter 704. A feedback circuit that includes an error amplifier 706 and a compensator 708 is included. The point of load converter 702 is configured to receive a trim voltage that causes the voltage on the point of load converter 702 output node to be adjusted for a given input voltage on the point of load converter input node. The feedback circuit of the error amplifier 706 and a compensator 708 is coupled to the switched converter 704 output node and compares the output DC voltage to a reference voltage $V_{ref}$ and in response to the comparison generates the trim voltage, resulting in regulation of the output voltage of the resonant switched capacitor converter 704.

Figure 8:
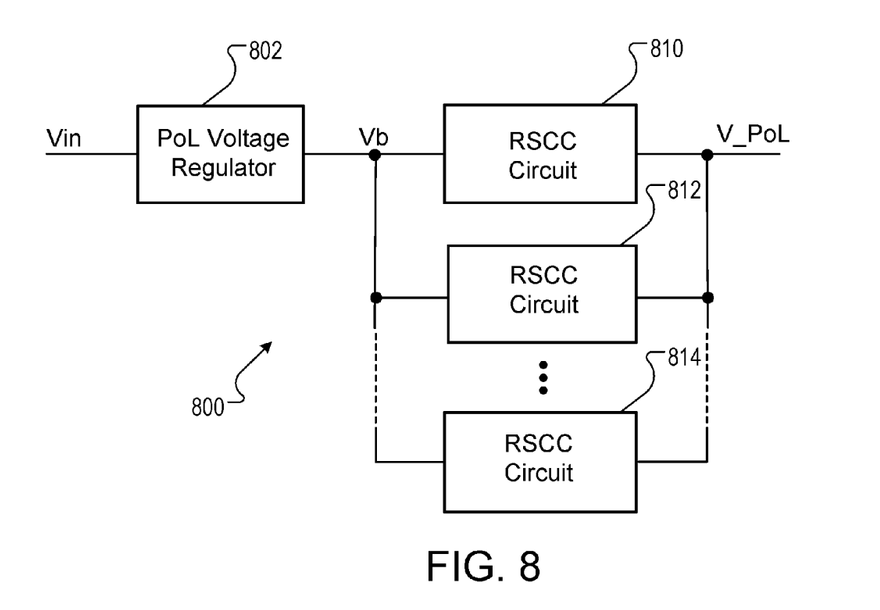
FIG. 8 is a block diagram of a two-stage point of load power delivery architecture with a point of load converter providing an output voltage as input to multiple resonant switched capacitor converters in parallel.

FIG. 8 is a block diagram of a two-stage point of load power delivery architecture 800 with a point of load converter 802 providing an output voltage as input to multiple resonant switched capacitor converters 810, 812 and 814 in parallel. A feedback circuit as described above may optionally be included, but is omitted from the drawing in FIG. 8. The parallel connection of the resonant switched capacitor converters 810, 812 and 814 results in a droop current sharing at the second stage. This facilitates a higher current delivery capacity to a load when compared to a single resonant switched capacitor converters.

An advantage of the two-stage power delivery architecture shown in FIGS. 7 and 8 is that the second stage resonant switched capacitor converter can be placed very close to a load IC, e.g., microprocessor, due to its high energy density. This results in a simplification of circuit bearing structure design in that fewer components are required to be able to provide high current delivery. Because the primary side of resonant switched capacitor converter has much higher impedance than its secondary, i.e., K^2 times higher, where K is the resonant switched capacitor converter voltage conversion ratio, the power distribution losses from the point of load voltage regulator to its secondary can be significantly reduced. Direct copper savings on a motherboard power plane, for example, can be achieved. Additionally, the output current and voltage of the first stage point of load voltage regulator are reduced and increased, respectively, by a factor of K, fewer phases are required and much higher efficiency can be achieved with the point of load voltage regulator.

Figure 9:
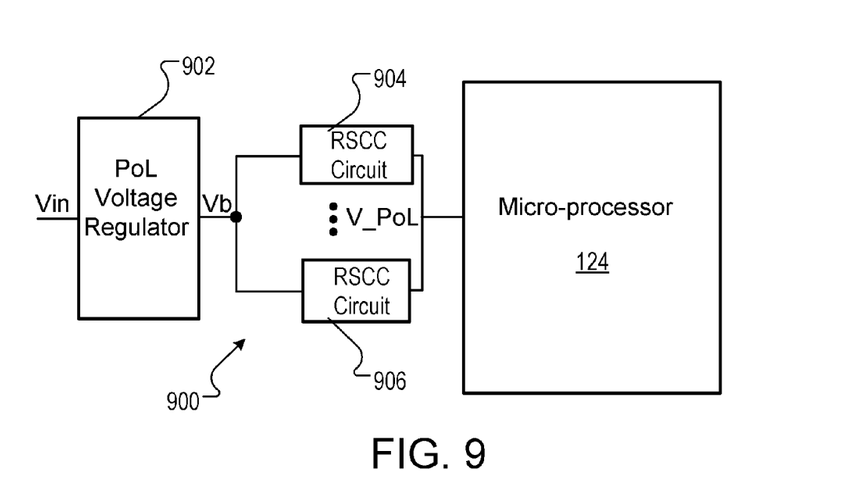
FIG. 9 is a block diagram a two-stage point of load power delivery architecture with a point of load converter providing an output voltage as input to multiple resonant switched capacitor converters in parallel architecture on a motherboard.

Such a configuration to realize these advantages is illustrated in FIG. 9, which is a block diagram a two-stage point of load power delivery architecture 900 with a point of load converter 902 providing an output voltage as input to multiple resonant switched capacitor converters 904, 906 in parallel architecture on a motherboard. Here the resonant switched capacitor converters 904, 906 are located very close to the microprocessor 124, which simplifies the design with respect to current carrying capacity.

Figure 10:
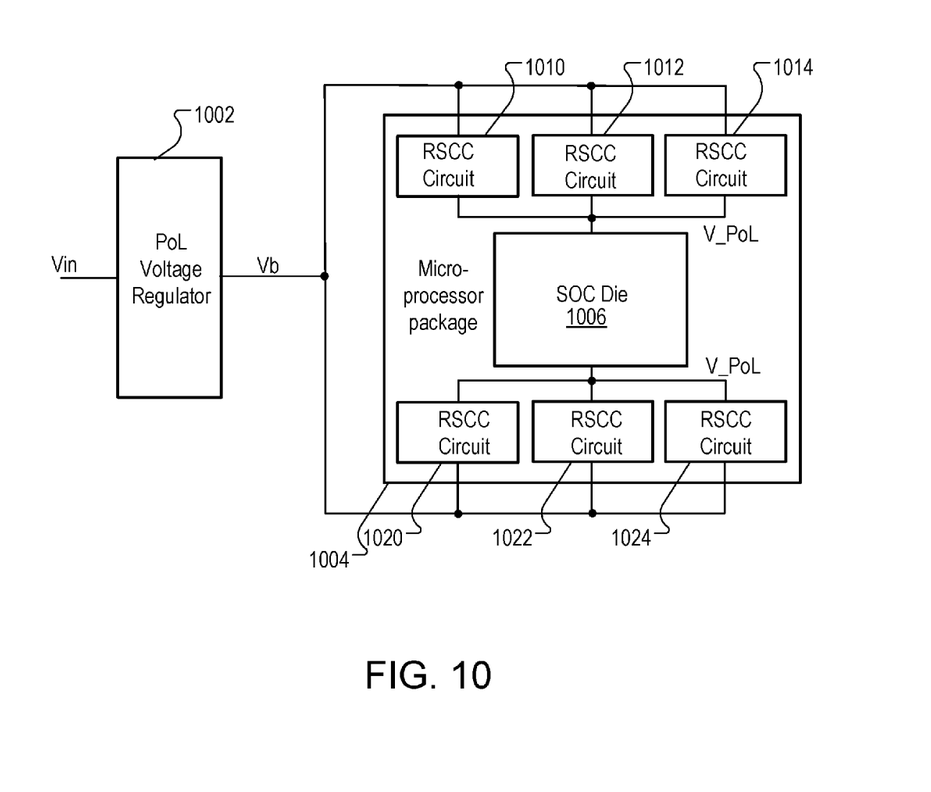
FIG. 10 is a block diagram of a microprocessor chip package with integrated multiple resonant switched capacitor converters in parallel.

FIG. 10 is a block diagram of a microprocessor chip package 1004 with integrated multiple resonant switched capacitor converters 1010, 1012, 1014 and 1020, 1022, 1024 in parallel. A point of load converter 1002 provides a source voltage to the resonant switched capacitor converters 1010, 1012, 1014 and 1020, 1022, 1024. The resonant switched capacitor converters 1010, 1012, 1014 and 1020, 1022, 1024 are integrated into the microprocessor chip package 1004, and the package includes a pin grid array for receiving a SOC dice 1006.

By integrating the resonant switched capacitor converters 1010, 1012, 1014 and 1020, 1022, 1024 into the package 1004, the package pins assigned for power delivery can be significantly reduced. Furthermore, the IR drop from the microprocessor socket contact resistances are significantly reduced as well, and thus better power delivery efficiency and power integrity is obtained.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments. Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus, comprising:
   a resonant switched capacitor converter comprising:
   a circuit bearing structure;
   a plurality of capacitors electrically connected to the circuit bearing structure, each capacitor having respective first and second nodes;
   a plurality of switches electrically connected to the circuit bearing structure, each switch having first and second terminals and an input that receives a control signal that places the switch in either a closed state in which a conduction path is established between the first and second terminals, or an open state in which the conduction path is eliminated between the first and second terminals;
   a plurality of respective conductive traces that each respectively connect one of the first or second nodes of a capacitor to one of the first or second terminals of a switch, and wherein:
   at least one conductive trace defines a switched converter input node for receiving an input DC voltage and at least one conductive trace defines a switched converter output node for outputting an output DC voltage to a load, wherein the output DC voltage is less than the input DC voltage; and stray inductances of the resonant switched capacitor converter form distributed resonant inductors within the resonant switched capacitor converter; and control logic that generates two or more sets of control signal inputs applied to the inputs of the switches so that two or more respective conduction paths that are different from each other are formed, wherein at least one conduction path connects the switched converter input node and the switched converter output node through at least two or more closed switches during a charging state, and each conduction path includes the switched converter output node in series with at least two or more switches in the closed state, and at least one conduction path isolates the input DC voltage from the switched converter output node during a discharge state, and wherein each conduction path forms a switched circuit unique to the conduction path and having a respective resonant frequency defined by the stray inductances of the resonant switched capacitor converter, and the control logic generates the respective sets of control signal inputs at respective resonant frequencies for each switched circuit.

2. The apparatus of claim 1, further comprising a point of load converter having a point of load converter input node and a point of load converter output node and is operatively connected to one of the switched converter input node or switched converter output node and that generates a point of load converter output voltage on the point of load converter output node.

3. The apparatus of claim 2, wherein the point of load converter input node is connected to the switched converter output node and the point of load converter output voltage is less than the output DC voltage.

4. The apparatus of claim 2, wherein the point of load converter output node is connected to the switched converter input node and the output DC voltage on the switched converter output node is less than the voltage on the point of load converter output node.

5. The apparatus of claim 4, wherein the point of load converter is configured to receive a trim voltage that causes the voltage on the point of load converter output node to be adjusted for a given input voltage on the point of load converter input node; and further comprising a feedback circuit coupled to the switched converter output node and that compares the output DC voltage to a reference voltage and in response to the comparison generates the trim voltage.

6. The apparatus of claim 4, further comprising a plurality of resonant switched capacitor converters connected in parallel at the switched converter input nodes and at the switched converter output nodes.

7. The apparatus of claim 6, wherein the circuit bearing structure is a microprocessor chip packaging.

8. The apparatus of claim 1, wherein the distributed resonant inductors are 10 nH or less.

9. The apparatus of claim 1, where the switches are MOSFETs.

10. The apparatus of claim 1, wherein the switched circuits unique to the conduction paths include at least one charging circuit that charges the capacitors from the input DC voltage and two or more discharging circuits in which a load connected to the switched converter output node discharges the capacitors.

11. The apparatus of claim 1, wherein the stray inductances are defined by the circuit bearing structure, the capacitors, the switches, and the lengths of the conductive traces, and the circuit bearing structure, the capacitors, the switches, and the lengths of the conductive traces are selected such that the resulting stray inductances from the lengths and respective positions of the conductive traces, the stray inductances of the circuit bearing structure, and the equivalent series inductances of the capacitors form the distributed resonant inductors within the resonant switched capacitor converter.

12. The apparatus of claim 1, wherein the stray inductances are defined, in part, by a magnetic material that is electrically isolated from, but magnetically coupled to, the switches, conductive traces, and capacitors of the resonant switched capacitor converter.

13. A microprocessor chip package, comprising:
a pin grid array receptacle for receiving a microprocessor chip; and
a plurality of a resonant switched capacitor converters, each resonant switched capacitor converter comprising:
a plurality of capacitors electrically connected to the chip package, each capacitor having respective first and second nodes;
a plurality of switches electrically connected to the chip package, each switch having first and second terminals and an input that receives a control signal that places the switch in either a closed state in which a conduction path is established between the first and second terminals, or an open state in which the conduction path is eliminated between the first and second terminals;
a plurality of respective conductive traces that each respectively connect one of the first or second nodes of a capacitor to one of the first or second terminals of a switch, and wherein:
at least one conductive trace defines a switched converter input node for receiving an input DC voltage and at least one conductive trace defines a switched converter output node for outputting an output DC voltage to a load, wherein the output DC voltage is less than the input DC voltage; and
stray inductances of the chip package form distributed resonant inductors within the resonant switched capacitor converter; and
control logic that generates two or more sets of control signal inputs applied to the inputs of the switches so that two or more respective conduction paths that are different from each other are formed, wherein at least one conduction path connects the switched converter input node and the switched converter output node through at least two or more closed switches during a charging state, and each conduction path includes the switched converter output node in series with at least two or more switches in the closed state, and at least one conduction path isolates the input DC voltage from the switched converter output node during a discharge state, and wherein each conduction path forms a switched circuit unique to the conduction path and having a respective resonant frequency defined by the stray inductances of the resonant switched capacitor converter, and the control logic generates the respective sets of control signal inputs at respective resonant frequencies for each switched circuit.

14. The microprocessor chip package of claim 13, wherein the plurality of resonant switched capacitor converters are connected in parallel.

15. The microprocessor chip package 13, wherein the distributed resonant inductors are 10 nH or less.

16. The microprocessor chip package 13, where the switches are MOSFETs.

17. The microprocessor chip package 13, wherein the switched circuits unique to the conduction paths include at least one charging circuit that charges the capacitors from the input DC voltage and one or more discharging circuits in which a load connected to the switched converter output node discharges the capacitors.

18. The microprocessor chip package of claim 13, wherein the chip package, the capacitors, the switches, and the lengths of the conductive traces are selected to form the resulting stray inductances from the lengths and respective positions of the conductive traces, the stray inductances of the chip package, and the equivalent series inductances of the capacitors.

19. The microprocessor chip package of claim 13, wherein the stray inductances are defined, in part, by a magnetic material that is electrically isolated from, but magnetically coupled to, the switches, conductive traces, and capacitors of the resonant switched capacitor converter.

* * * * *